(12) United States Patent
Zhao

(10) Patent No.: US 10,334,491 B2
(45) Date of Patent: Jun. 25, 2019

(54) MESSAGE TRANSMISSION METHOD, USER EQUIPMENT, BASE STATION, AND SYSTEM

(71) Applicant: Huawei Technologies Co., Ltd., Shenzhen (CN)

(72) Inventor: Zhenshan Zhao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 23 days.

(21) Appl. No.: 15/599,223

(22) Filed: May 18, 2017

(65) Prior Publication Data
US 2017/0257805 A1 Sep. 7, 2017

Related U.S. Application Data

(63) Continuation of application No. PCT/CN2014/091638, filed on Nov. 19, 2014.

(51) Int. Cl.
*H04W 36/00* (2009.01)
*H04W 36/04* (2009.01)
(Continued)

(52) U.S. Cl.
CPC .......... *H04W 36/04* (2013.01); *H04W 24/10* (2013.01); *H04W 36/0077* (2013.01);
(Continued)

(58) Field of Classification Search
CPC ......... H04W 4/90; H04W 88/06; H04W 4/80; H04W 84/12; H04W 48/16
(Continued)

(56) References Cited

U.S. PATENT DOCUMENTS

2007/0206531 A1* 9/2007 Pajukoski ........... H04W 74/002
370/329
2011/0151914 A1* 6/2011 Leng ................. H04W 72/0413
455/509
(Continued)

FOREIGN PATENT DOCUMENTS

| CN | 101594678 A | 12/2009 |
|---|---|---|
| CN | 102088775 A | 6/2011 |

(Continued)

OTHER PUBLICATIONS

"D2D Resource Pool Configuration," 3GPP TSG RAN WG1 Meeting #78bis, Ljubljana, Slovenia, R1-144066, XP50875362, 3rd Generation Partnership Project, Valbonne, France (Oct. 6-10, 2014).

(Continued)

*Primary Examiner* — Joseph Arevalo
(74) *Attorney, Agent, or Firm* — Leydig, Voit & Mayer, Ltd.

(57) ABSTRACT

The embodiments of the present invention disclose a message transmission method, user equipment, a base station, and a communications system. The message transmission method in embodiments of the present invention includes: receiving, by first user equipment, information about a contention resource from a cellular network base station, where the contention resource is a transmission resource obtained in an autonomous contention manner; and contending, by the first user equipment, for a transmission resource in a time window corresponding to the contention resource, and if the transmission resource is obtained, transmitting a message to second user equipment by using the obtained transmission resource.

16 Claims, 5 Drawing Sheets

(51) Int. Cl.
*H04W 76/27* (2018.01)
*H04W 24/10* (2009.01)
*H04W 36/30* (2009.01)
*H04W 74/08* (2009.01)
*H04W 74/02* (2009.01)
*H04W 88/02* (2009.01)
*H04W 88/08* (2009.01)

(52) U.S. Cl.
CPC ....... *H04W 36/0088* (2013.01); *H04W 36/30* (2013.01); *H04W 74/02* (2013.01); *H04W 74/0833* (2013.01); *H04W 76/27* (2018.02); *H04W 74/0808* (2013.01); *H04W 88/02* (2013.01); *H04W 88/08* (2013.01)

(58) Field of Classification Search
USPC ... 455/450, 509, 404.1, 426.1, 452.1, 552.1, 455/517
See application file for complete search history.

(56) References Cited

U.S. PATENT DOCUMENTS

| | | | |
|---|---|---|---|
| 2011/0170515 A1* | 7/2011 | Kim | H04W 72/042 370/330 |
| 2011/0263286 A1* | 10/2011 | Damnjanovic | H04W 74/008 455/513 |
| 2011/0306349 A1 | 12/2011 | Hakola et al. | |
| 2013/0102320 A1* | 4/2013 | Suzuki | H04W 72/042 455/452.1 |
| 2014/0169336 A1* | 6/2014 | Oh | H04W 36/0055 370/332 |
| 2015/0045018 A1* | 2/2015 | Liu | H04L 1/00 455/426.1 |
| 2015/0087348 A1 | 3/2015 | Ohta et al. | |
| 2016/0219475 A1* | 7/2016 | Kim | H04L 5/00 |

FOREIGN PATENT DOCUMENTS

| | | |
|---|---|---|
| CN | 102104961 A | 6/2011 |
| CN | 102158981 A | 8/2011 |
| EP | 1511246 A2 | 3/2005 |
| EP | 2536241 A1 | 12/2012 |
| WO | 2011099150 A1 | 8/2011 |
| WO | 2013131553 A1 | 9/2013 |

OTHER PUBLICATIONS

"Text proposal for procedure and radio resource allocation," 3GPP TSG-RAN WG2 #84, Ljubljana, Slovenia, R2-133842, 3rd Generation Partnership Project, Valbonne, France (Oct. 7-11, 2013).

"Direct Discovery Resource Allocation," 3GPP TSG RAN WG2 Meeting #85, Prague, Czech Republic, R2-140192, pp. 1-3, 3rd Generation Partnership Project, Valbonne, France (Feb. 10-14, 2014).

"Resource allocation for D2D communication," 3GPP TSG RAN WG2 Meeting #85, Prague, Czech Republic, R2-140312, XP507917505, 3rd Generation Partnership Project, Valbonne, France (Feb. 10-14, 2014).

"Resource allocation for Mode-2," 3GPP TSG-RAN WG2 #85bis, Valencia, Spain, R2-141134, XP50817732, pp. 1-2, 3rd Generation Partnership Project, Valbonne, France (Mar. 31-Apr. 4, 2014).

"IEEE Standard for Information technology-Telecommunications and information exchange between systems—Local and metropolitan area networks—Specific requirements, Part 11: Wireless LAN Medium Access Control (MAC) and Physical Layer (PHY) Specifications; Amendment 6: Wireless Access in Vehicular Environments," IEEE Std 802.11 pTM-2010, IEEE Computer Society, Institute of Electrical and Electronics Engineers, New York, New York (Jul. 15, 2010).

"Draft SAE J2735 Dedicated Short Range—Communications (DSRC) Message Set Dictionary," Surface Vehicle Standard, SAE J2735-Draft-Rev29, Society of Automotive Engineers, Inc., (2008).

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," 3GPP TS 36.300 V12.2.0, pp. 1-215, 3rd Generation Partnership Project, Valbonne, France (Jun. 2014).

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," 3GPP TS 36.300 V12.3.0, pp. 1-215, 3rd Generation Partnership Project, Valbonne, France (Sep. 2014).

"Integrated resource scheduling for in-coverage D2D communication to support Mode 1 and Mode 2", 3GPP TSG RAN WG1 Meeting #76bis, R1-141499, 3rd Generation Partnership Project, Valbonne, France (Mar. 31-Apr. 4, 2014).

* cited by examiner

MESSAGE TRANSMISSION METHOD, USER EQUIPMENT, BASE STATION, AND SYSTEM

CROSS-REFERENCE TO RELATED APPLICATIONS

This application is a continuation of International Application No. PCT/CN2014/091638, filed on Nov. 19, 2014, the disclosure of which is hereby incorporated by reference in its entirety.

TECHNICAL FIELD

The embodiments of the present invention relate to the field of communications technologies, and in particular, to a message transmission method, user equipment, a base station, and a system.

BACKGROUND

In recent years, the Internet of Vehicles attracts increasingly more attention from people. In the Internet of Vehicles, vehicle to vehicle (V2V) communication or communication between a vehicle and a roadside unit (RSU) is used to improve road traffic safety and reliability and enhance traffic efficiency. In the Internet of Vehicles, to ensure vehicle driving safety, status information needs to be periodically exchanged between vehicles. In different standards or specifications, the information has different names, such as a basic safety message (BSM) and a cooperative awareness message (CAM) that are collectively referred to as a periodic status message (PSM) herein. The PSM may be understood as a "heartbeat packet" of a vehicle, includes vehicle information such as a location, a speed, and a status, and is broadcast to surrounding vehicles in a single-hop manner at a specific frequency. For example, the frequency may be 10 Hz. User equipment in the Internet of Vehicles moves at an extremely high speed, and therefore, the PSM has an extremely high requirement for a service delay.

The Institution of Electrical and Electronics Engineers (IEEE) 802.11p (also referred to as WAVE, Wireless Access in the Vehicular Environment) standard is a communications protocol extended from the IEEE 802.11 standard, and is mainly used for vehicle electronics wireless communication. The IEEE 802.11p standard is essentially extension of the IEEE 802.11, and meets related application in an intelligent transportation system (ITS), and the application includes data exchange between vehicles at a high speed, and data exchange between a vehicle and an ITS roadside infrastructure. The IEEE 802.11p standard has the following advantages: easy deployment, low costs, and a mature technology, and is applicable to vehicle to vehicle transmission. However, the standard also has corresponding disadvantages: When there are a large quantity of vehicles, resources are prone to conflict, and consequently, system performance becomes worse, a delay is uncontrollable, quality of service (QoS) cannot be ensured, a transmission distance is limited, and costs of deploying a large quantity of roadside units (RSU) are extremely high. Because of these disadvantages, a problem that the PSM has a high delay requirement in the Internet of Vehicles cannot be resolved by using the IEEE 802.11p standard.

The foregoing problem arouses people to undertake researches on assisting vehicle to vehicle communication by using an existing cellular network. Currently, 2G/3G/4G technologies are used for cellular communication. A Long Term Evolution (LTE) technology used in a 4G system has advantages such as a high rate, a low delay, a large coverage area, and supporting a high-speed mobile terminal. In vehicle to vehicle communication in the cellular network, a central scheduler such as an evolved NodeB (eNodeB, eNB) may be fully used to dynamically schedule transmission resources, so that a communication conflict probability is reduced, and a problem of an uncontrollable delay is resolved.

In an existing LTE system, if UE needs to transmit data, in an initial transmission process, a basic procedure is shown in FIG. 1. First, a primary synchronization signal/secondary synchronization signal (PSS/SSS) needs to be detected to perform downlink synchronization, and cell identification (ID) is obtained. Then, a master information block/system information block (MIB/SIB) is detected to obtain cell configuration information. Subsequently, the UE initiates an uplink random access process to perform uplink synchronization, obtains uplink resource allocation information by sending a scheduling request/buffer status report (SR/BSR), and finally, transmits the data by using an allocated resource. In the foregoing initial transmission process, because the UE needs to initiate the uplink random access process, an extremely large delay is caused. For example, the delay is approximately 50 to 100 ms. In addition, an SR/BSR transmission process also causes an extra delay. Consequently, the initial transmission process in the LTE system cannot meet a delay requirement in an Internet of Vehicles system.

In addition, in the existing LTE system, if the UE is in a connected state, and moves from one cell to another cell, cell handover occurs. A signaling procedure of the cell handover is shown in FIG. 2, and a handover process is as follows:

0. When a connection is set up or during last update of a timing advance (TA), context about UE roaming and an access restriction is provided to a source eNB.

1. The source eNB instructs, according to information about the UE roaming and the access restriction, the UE to perform physical layer measurement.

2. The UE reports a measurement report to the source eNB.

3. The source eNB determines, according to measurement report information and radio resource management (RRM) information, whether the UE needs to hand over a cell.

4. The source eNB initiates a handover request to a target eNB, and transmits, to the target eNB, information required for the handover.

5. The target eNB determines, according to received quality of service information, whether to allow the UE to perform the handover.

6. The target eNB sends handover acknowledge information to the source eNB to allow the UE to hand over the cell.

7. The source eNB sends a radio resource control connection reconfiguration message RRCConnectionReconfiguration to the UE.

8. The source eNB sends a serial number status transfer (SN STATUS TRANSFER) message to the target eNB.

9. After receiving the radio resource control connection reconfiguration message RRCConnectionReconfiguration, the UE synchronizes with the target eNB, and accesses a target cell by initiating a random access procedure RACH.

10. The target eNB transmits timing advance information and resource allocation information to the UE.

11. After the UE successfully accesses the target cell, the UE sends a radio resource control connection reconfiguration complete message RRCConnectionReconfigurationComplete and a BSR to the target cell, to indicate that the UE has completed a handover process and the target eNB can transmit data to the UE.

12. The target eNB transmits a path switch request PATH SWITCH REQUEST message to a mobility management entity MME, to notify the MME that the UE has changed the cell.

13. The MME transmits a modify bearer request MODIFY BEARER REQUEST message to a serving gateway.

14. The serving gateway switches a downlink data path to a target cell side.

15. The serving gateway transmits a modify bearer response MODIFY BEARER RESPONSE to the mobility management entity MME.

16. The MME responds to the path switch request PATH SWITCH REQUEST message by transmitting a path switch request acknowledge PATH SWITCH REQUEST ACKNOWLEDGE message.

17. After receiving the path switch request acknowledge PATH SWITCH REQUEST ACKNOWLEDGE message transmitted by the MME, the target eNB notifies, by transmitting a UE context release (UE CONTEXT RELEASE) message to the source eNB, the source eNB that the UE has successfully switched the cell, and triggers the source eNB to release a resource.

18. After receiving the UE context release message, the source eNB releases radio and control plane resources related to UE context.

In the cell handover process, the UE can transmit a service only after accessing the target cell by initiating the random access process, and obtaining the resource allocation information of the target cell. This process causes an extremely large delay. The foregoing handover process includes a large quantity of signaling overheads including signaling exchange between the UE and the source and target eNBs, signaling exchange between the source eNB and the target eNB, and the like. When the foregoing handover process is used in the Internet of Vehicles system to hand over a cell, because of a high-speed moving feature of a vehicle, cells are handed over frequently. Consequently, there is a relatively large handover delay and relatively high signaling overheads in the system.

SUMMARY

To resolve a problem in the conventional art, embodiments of the present invention provide a message transmission method, user equipment, a base station, and a system, to resolve technical problems of an excessively long delay in an existing cellular network, and an excessively long delay and excessively large information overheads in a cell handover process.

In one aspect, an embodiment of the present invention provides a message transmission method, including: receiving, by first user equipment, information about a contention resource from a cellular network base station, where the contention resource is a transmission resource obtained in an autonomous contention manner; and contending, by the first user equipment, for a transmission resource in a time window corresponding to the contention resource, and if the transmission resource is obtained, transmitting a message to second user equipment by using the obtained transmission resource.

In another aspect, an embodiment of the present invention provides a message transmission method in a cell handover process in a cellular network, including: receiving, by first user equipment, a measurement control signal from a source base station, and reporting a measurement report to the source base station after neighboring cell measurement; when handover is required, receiving, by the first user equipment, information that is about a contention resource and that is sent by a target base station, where the contention resource is a transmission resource obtained in an autonomous contention manner; and contending, by the first user equipment, for a transmission resource in a time window corresponding to the contention resource, and if the transmission resource is obtained, transmitting a message to second user equipment by using the obtained transmission resource.

In another aspect, an embodiment of the present invention provides a resource configuration method, including: sending, by a cellular network base station, information about a contention resource to first user equipment, where the contention resource is a transmission resource obtained in an autonomous contention manner, the contention resource is applicable to enabling the first user equipment to contend for a transmission resource in a time window corresponding to the contention resource, and enabling the first user equipment to transmit, when the first user equipment obtains the transmission resource, a message to second user equipment by using the obtained transmission resource.

In another aspect, an embodiment of the present invention provides first user equipment, including: a receiver, configured to receive information about a contention resource from a cellular network base station, where the contention resource is a transmission resource obtained in an autonomous contention manner; a processor, configured to contend, according to the information that is about the contention resource and that is received by the receiver, for a transmission resource in a time window corresponding to the contention resource; and a transmitter, configured to: when the processor obtains the transmission resource, transmit a message to second user equipment by using the obtained transmission resource.

In another aspect, an embodiment of the present invention provides a cellular network base station, including: a transmitter, configured to send information about a contention resource to first user equipment, where the contention resource is a transmission resource obtained in an autonomous contention manner, the contention resource enables the first user equipment to contend for a transmission resource in a time window corresponding to the contention resource, and enables the first user equipment to transmit, when the first user equipment obtains the transmission resource, a message to second user equipment by using the obtained transmission resource.

In another aspect, an embodiment of the present invention provides a communications system, including first user equipment and a cellular network base station, where the first user equipment includes: a first user equipment receiver, configured to receive information about a contention resource from the base station, where the contention resource is a transmission resource obtained in an autonomous contention manner; a first user equipment processor, configured to contend, according to the information that is about the contention resource and that is received by the receiver, for a transmission resource in a time window corresponding to the contention resource; and a first user equipment transmitter, configured to: when the processor obtains the transmission resource, transmit a message to second user equipment by using the obtained transmission resource; and the base station includes: a base station transmitter, configured to send the information about the contention resource to the first user equipment.

The embodiments of the present invention provide technical solutions of the message sending method, the user equipment, the base station, and the communications system. In the embodiments of the present invention, a cellular network base station sends information about a contention resource. After receiving the information about the contention resource, user equipment may contend for a transmission resource in a time window corresponding to the transmission resource obtained in an autonomous contention manner, and transmit a message to other user equipment by using the obtained transmission resource. Therefore, the user equipment does not always need to first apply to the base station for a resource and wait for resource allocation of the base station before transmitting a message, but obtains, by means of autonomous contention, a contention resource reserved by the base station, and transmits the message, so that a delay is significantly reduced. When the technical solutions are applied to cell handover, data does not need to be transmitted after a target base station allocates a resource in all cases, and the user equipment autonomously contends for a contention resource reserved by the target base station and then transmits a message. Therefore, a delay and signaling overheads are effectively reduced.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Embodiment 1

Figure 1:
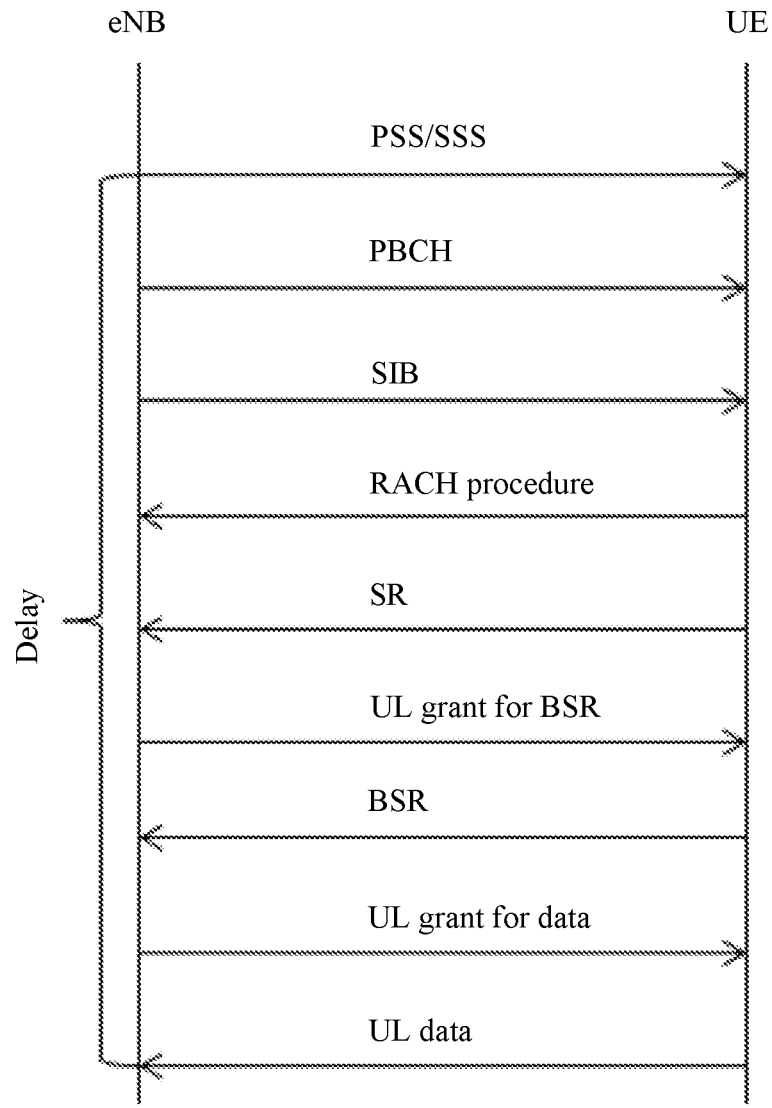
FIG. 1 is a basic schematic flowchart of initial transmission performed by UE.
Figure 2:
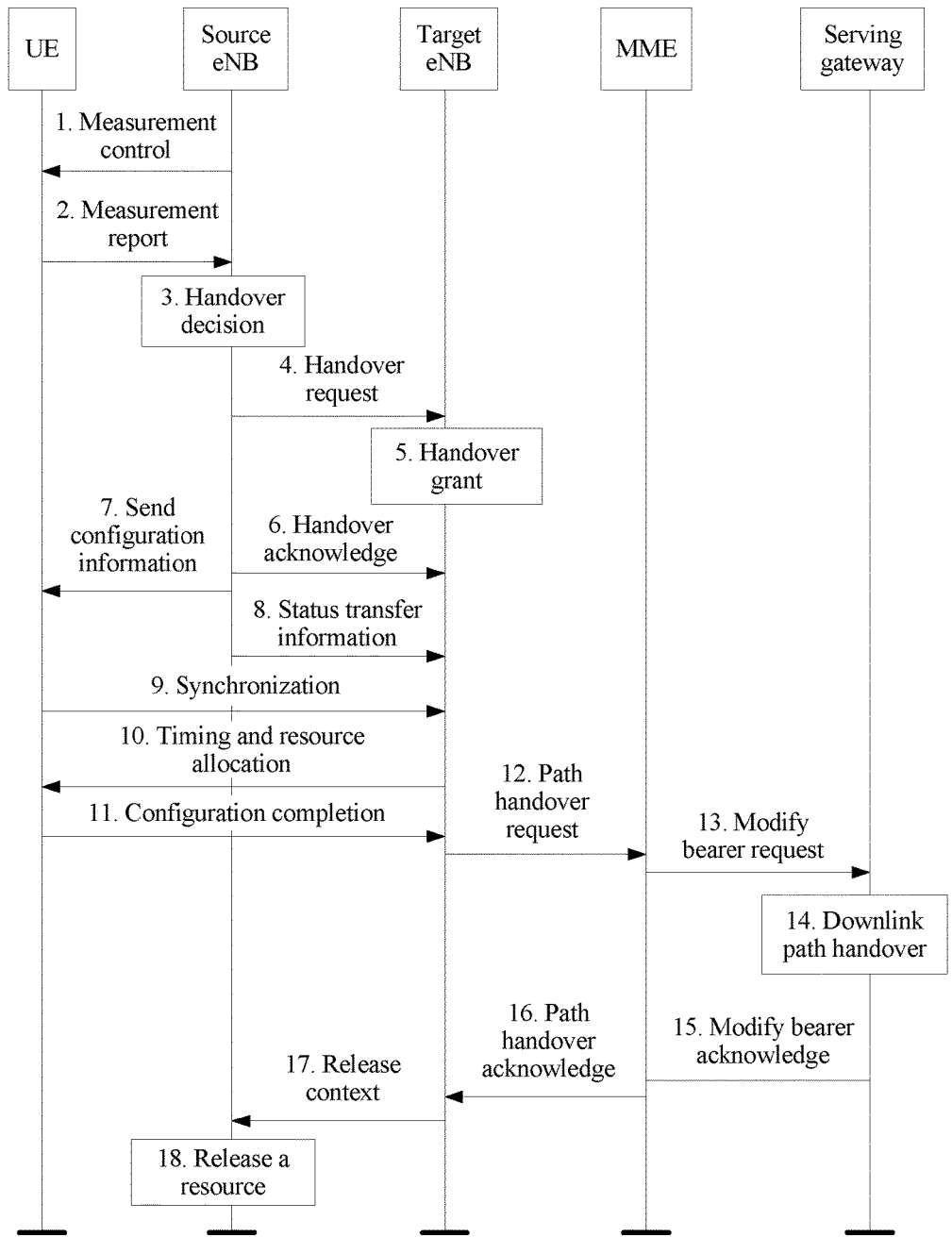
FIG. 2 is a basic schematic flowchart of cell handover performed by UE.
Figure 3:
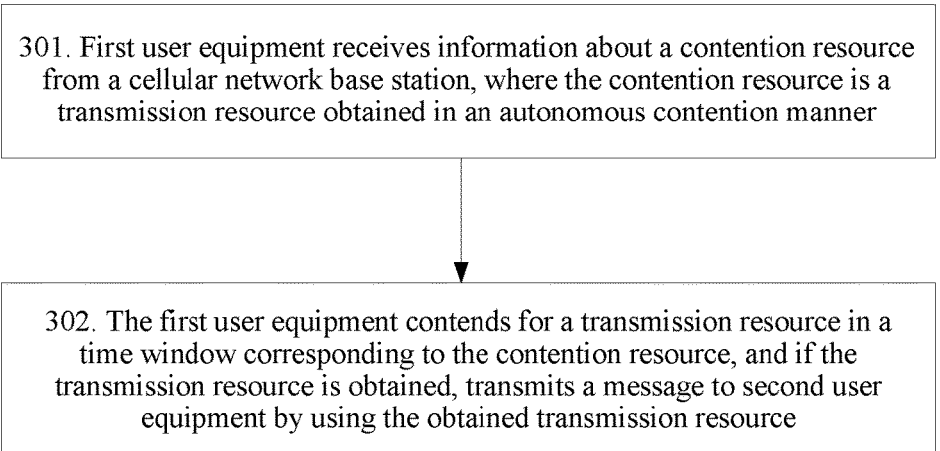
FIG. 3 is a flowchart of a message transmission method according to an embodiment of the present invention.

FIG. 3 is a flowchart of a message transmission method according to this embodiment. The method includes the following steps:

Step 301: First user equipment receives information about a contention resource from a cellular network base station, where the contention resource is a transmission resource obtained in an autonomous contention manner.

Step 302: The first user equipment contends for a transmission resource in a time window corresponding to the contention resource, and if the transmission resource is obtained, transmits a message to second user equipment by using the obtained transmission resource.

In this embodiment, information received by the first user equipment from the cellular network base station includes the information about the contention resource. User equipment in a cell, including the first user equipment, can learn, by using the information about the contention resource, a resource such as a subframe/timeslot that is the contention resource in resources. For the contention resource, the first user equipment may autonomously initiate contention for a transmission resource without a need to wait for resource allocation performed by the base station. If the first user equipment successfully obtains the transmission resource by means of contention, the first user equipment transmits a message in a time window corresponding to the obtained transmission resource, and does not always need to first apply to the base station for a resource and wait for the base station to schedule and allocate a transmission resource. Therefore, a delay is effectively reduced. In this manner, a data sending delay can be effectively reduced. When the method is applied to initial access of user equipment, an access delay of the user equipment can be effectively reduced, and a message can be quickly transmitted to other user equipment.

Preferably, the first user equipment further receives information about a non-contention resource from the base station, the non-contention resource is a transmission resource allocated by the base station according to an application, and if the first user equipment obtains no transmission resource after X ms or after K times of contention, the first user equipment applies to the base station for a transmission resource, and transmits a message to the second user equipment by using a transmission resource allocated by the base station, where X is a rational number, and K is a positive integer. The information obtained by the first user equipment from the base station further includes the information about the non-contention resource, that is, the first user equipment may also transmit a message by using the non-contention resource. Therefore, when obtaining no transmission resource after a predetermined time or predetermined times of contention, the first user equipment may apply to the base station for the transmission resource, and transmit a message by using the transmission resource allocated by the base station. Therefore, even if the first user equipment cannot obtain an available transmission resource in an autonomous contention manner, the first user equipment can still transmit a message, so that communications quality and user equipment security are ensured.

Preferably, when the first user contends for the transmission resource in the time window corresponding to the contention resource, to avoid a contention conflict, the following step is performed: That the first user equipment contends for the transmission resource in the time window corresponding to the contention resource specifically includes: If the first user learns, by means of monitoring, that the transmission resource is in an idle state and the transmission resource is still in an idle state after Y ms, the first user equipment transmits a message to the second user equipment by using the transmission resource, where Y is a rational number.

Preferably, the information about the contention resource or the information about the non-contention resource is carried in any one of a master information block (MIB), a system information block (SIB), or radio resource control (RRC) signaling. In a specific implementation process, the information about the contention resource or the information about the non-contention resource may be transmitted in multiple manners. For example, the information about the contention resource or the information about the non-contention resource may be transmitted in one or more of a MIB, a SIB, or RRC in existing LTE, or may be transmitted by adding a new MIB, a new SIB, a new RRC message, or a new signaling type.

Preferably, the resource obtained by the first user equipment from the base station by means of application includes the contention resource and/or the non-contention resource. When the cellular network base station allocates the transmission resource to the first user equipment according to the application of the first user equipment, the base station not only can schedule the non-contention resource, but also can schedule all available contention resources, to improve transmission resource utilization to a maximum extent.

Preferably, X ms is determined by the base station or is a predefined time. Specifically, the predetermined time X ms may be assigned by the base station in the information about the contention resource or other information. The predefined time is a predetermined time, for example, the predefined time may be a time predefined by using a specification.

Preferably, the K times of contention is determined by the base station or is a predefined quantity of times. Specifically, the quantity K of contention times may be assigned by the base station in the information about the contention resource or other information. Alternatively, the quantity K of contention times is a predefined quantity of times, for example, the quantity K of contention times may be a quantity of contention times predefined by using a specification.

Figure 4:
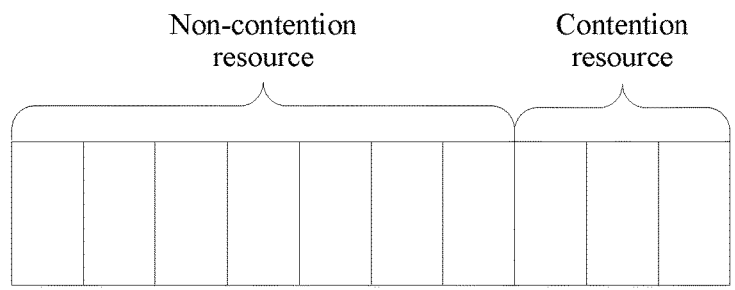
FIG. 4 is a schematic diagram of resource distribution in a frame structure according to an embodiment of the present invention.

Preferably, the information about the contention resource or the information about the non-contention resource includes information about a quantity and/or a location of the transmission resource in a radio frame in which the transmission resource is located. Specifically, the information about the contention resource or the information about the non-contention resource may include quantity information of the contention resource and quantity information of the non-contention resource, for example, quantities of subframes/timeslots occupied by the contention resource and the non-contention resource respectively in a single radio frame, or may include location distribution information of the contention resource and the non-contention resource in a radio frame structure. A preferred indication method is to indicate distribution of the contention resource and the non-contention resource by using a bitmap. As shown in FIG. 4, 1 indicates that the subframe/timeslot is a non-contention resource, and 0 indicates that the subframe/timeslot is a non-contention resource. It may be learned from FIG. 4 that the first to the seventh subframes/timeslots are non-contention resources, and the eighth to the tenth subframes are contention resources. Therefore, bit information corresponding to configuration information is 1111111000. In another preferred indication method, for example, it may be specified that a front part of an entire radio frame indicates non-contention resources, and a rear part indicates contention resources. If a quantity of non-contention resources is N, for the non-contention resources shown in FIG. 4, bits 0111 are enough to indicate the quantity of non-contention resources, that is, less bit information can indicate locations and quantities of the non-contention resources and the contention resources. However, in this method, the bit information needs to be specified or additionally assigned to indicate a location relationship between the non-contention resources and the contention resources. Certainly, a person skilled in the art may understand that the contention resource and the non-contention resource may be indicated in different manners. The contention resource may be located in front of the non-contention resource. Alternatively, the contention resources and the non-contention resources are cross-distributed.

The method in this embodiment may be performed by vehicle-mounted user equipment, or may be performed by common user equipment.

Embodiment 2

Figure 5:
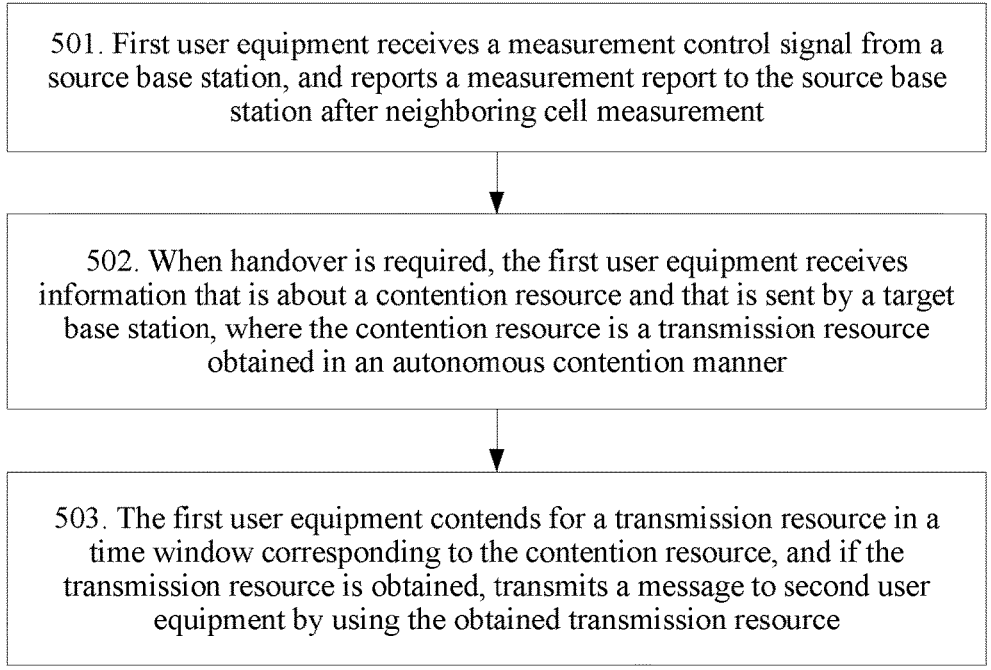
FIG. 5 is a flowchart of a message transmission method in a cell handover process according to an embodiment of the present invention.

FIG. 5 is a flowchart of a message transmission method in a cell handover process in a cellular network according to this embodiment. The method includes the following steps:

501. First user equipment receives a measurement control signal from a source base station, and reports a measurement report to the source base station after neighboring cell measurement.

502. When handover is required, the first user equipment receives information that is about a contention resource and that is sent by a target base station, where the contention resource is a transmission resource obtained in an autonomous contention manner.

503. The first user equipment contends for a transmission resource in a time window corresponding to the contention resource, and if the transmission resource is obtained, transmits a message to second user equipment by using the obtained transmission resource.

In this embodiment, information received by the first user equipment from a cellular network target base station includes the information about the contention resource. User equipment in a cell, including the first user equipment, can learn, by using the information about the contention resource, a resource such as a subframe/timeslot that is the contention resource in resources. When the first user equipment needs to send a message in a cell handover process, the first user equipment first initiates contention for a contention resource in a time window corresponding to the contention resource. If the transmission resource is successfully obtained by means of contention, the first user equipment transmits the message by using the obtained transmission resource, and does not always need to first apply to the target base station and wait for resource allocation. Therefore, a delay is effectively reduced. In this manner, a message transmission delay can be effectively reduced. When the method is applied to cell handover of user equipment, an access delay of the user equipment can be effectively reduced, and periodic status information can be quickly sent to other user equipment such as a vehicle. In addition, the base station only assists, in a resource scheduling manner, the user equipment in communication between user equipment. Therefore, when a cell is being handed over, information does not need to be exchanged between the source base station and the target base station, so that signaling overheads are reduced.

Preferably, the first user equipment further receives information about a non-contention resource from the target base station, the non-contention resource is a transmission resource allocated by the target base station according to an application, and if the first user equipment obtains no transmission resource after X ms or after K times of contention, the first user equipment applies to the target base station for a transmission resource, and transmits a message to the second user equipment by using a transmission resource allocated by the target base station, where X is a rational number, and K is a positive integer. The information obtained by the first user equipment from the target base station further includes the information about the non-contention resource, that is, the first user equipment may also transmit a message by using the non-contention resource. Therefore, when obtaining no transmission resource after a predetermined time or predetermined times of contention, the first user equipment may apply to the target base station for the transmission resource, and transmit a message by using the transmission resource allocated by the target base station. Therefore, even if the first user equipment cannot obtain an available transmission resource in an autonomous contention manner, the first user equipment can still transmit a message, so that communications quality and user equipment security are ensured.

Preferably, when the first user contends for the transmission resource in the time window corresponding to the contention resource, to avoid a contention conflict, the following step is performed: That the first user equipment contends for the transmission resource in the time window corresponding to the contention resource specifically includes: If the first user learns, by means of monitoring, that the transmission resource is in an idle state and the transmission resource is still in an idle state after Y ms, the first user equipment transmits a message to the second user equipment by using the transmission resource, where Y is a rational number.

Preferably, the information about the contention resource or the information about the non-contention resource is carried in any one of a master information block (MIB), a system information block (SIB), or radio resource control (RRC) signaling. In a specific implementation process, the information about the contention resource or the information about the non-contention resource may be transmitted in multiple manners. For example, the information about the contention resource or the information about the non-contention resource may be transmitted in one or more of a MIB, a SIB, or RRC in existing LTE, or may be transmitted by adding a new MIB, a new SIB, a new RRC message, or a new signaling type.

Preferably, the resource obtained by the first user equipment from the target base station by means of application includes the contention resource and/or the non-contention resource. When the cellular network base station allocates the transmission resource to the first user equipment according to the application of the first user equipment, the base station not only can schedule the non-contention resource, but also can schedule all available contention resources, to improve transmission resource utilization to a maximum extent.

Preferably, X ms is determined by the base station or is a predefined time. Specifically, the predetermined time X ms may be assigned by the base station in the information about the contention resource or other information. The predefined time is a predetermined time, for example, the predefined time may be a time predefined by using a specification.

Preferably, the K times of contention is determined by the base station or is a predefined quantity of times. Specifically, the quantity K of contention times may be assigned by the base station in the information about the contention resource or other information. Alternatively, the quantity K of contention times is a predefined quantity of times, for example, the quantity K of contention times may be a quantity of contention times predefined by using a specification.

Preferably, the information about the contention resource or the information about the non-contention resource includes information about quantities and/or locations of the contention resource and the non-contention resource in a radio frame in which the resources are located. Specifically, the information about the contention resource or the information about the non-contention resource may include quantity information of the contention resource and quantity information of the non-contention resource, for example, quantities of subframes/timeslots occupied by the contention resource and the non-contention resource respectively in a single radio frame, or may include location distribution information of the contention resource and the non-contention resource in a radio frame structure. A preferred indication method is to indicate distribution of the contention resource and the non-contention resource by using a bitmap. As shown in FIG. 4, 1 indicates that the subframe/timeslot is a non-contention resource, and 0 indicates that the subframe/timeslot is a non-contention resource. It may be learned from FIG. 4 that the first to the seventh subframes/timeslots are non-contention resources, and the eighth to the tenth subframes are contention resources. Therefore, bit information corresponding to configuration information is 1111111000. In another preferred indication method, for example, it may be specified that a front part of an entire radio frame indicates non-contention resources, and a rear part indicates contention resources. If a quantity of non-contention resources is N, for the non-contention resources shown in FIG. 4, bits 0111 are enough to indicate the quantity of non-contention resources, that is, less bit information can indicate locations and quantities of the non-contention resources and the contention resources. However, in this method, the bit information needs to be specified or additionally assigned to indicate a location relationship between the non-contention resources and the contention resources. Certainly, a person skilled in the art may understand that the contention resource and the non-contention resource may be indicated in different manners. The contention resource may be located in front of the non-contention resource. Alternatively, the contention resources and the non-contention resources are cross-distributed.

The method in this embodiment may be performed by vehicle-mounted user equipment, or may be performed by common user equipment.

Embodiment 3

This embodiment provides a resource configuration method, and the method includes the following:

A cellular network base station sends information about a contention resource to first user equipment. The contention resource is a transmission resource obtained in an autonomous contention manner, the contention resource is applicable to enabling the first user equipment to contend for a transmission resource in a time window corresponding to the contention resource, and enabling the first user equipment to transmit, when the first user equipment obtains the transmission resource, a message to second user equipment by using the obtained transmission resource.

In this embodiment, the cellular network base station sends the information about the contention resource to the first user equipment. User equipment in a cell, including the first user equipment, can learn, by using the information about the contention resource, a resource such as a subframe/timeslot that is the contention resource in resources. For the contention resource, the first user equipment may contend, in the time window corresponding to the contention resource, for a transmission resource without a need to wait for resource allocation performed by the base station. If the first user equipment successfully obtains the transmission resource by means of contention, the first user equipment transmits a message by using the obtained transmission resource, and does not always need to first apply to the base station for a resource and wait for the base station to schedule and allocate a transmission resource. Therefore, a delay is effectively reduced. In this manner, a data sending delay can be effectively reduced. When the method is applied to initial access of user equipment, an access delay of the user equipment can be effectively reduced, and information can be quickly sent to other user equipment. In addition, when the method is applied to cell handover, the base station only assists, in a resource scheduling manner, user equipment in communication between user equipment. Therefore, when a cell is being handed over, information does not need to be exchanged between a source base station and a target base station, so that signaling overheads are reduced.

Preferably, the base station further sends information about a non-contention resource to the first user equipment, the non-contention resource is a transmission resource allocated by the target base station according to an application, and if the first user equipment obtains no transmission resource after X ms or after K times of contention, the first user equipment applies to the base station for a transmission resource, and transmits a message to the second user equipment by using a transmission resource allocated by the base station, where X is a rational number, and K is a positive integer. Information sent by the base station to the first user equipment further includes the information about the non-contention resource, that is, the first user equipment may also transmit a message by using the non-contention resource. Therefore, when obtaining no transmission resource after a predetermined time or predetermined times of contention, the first user equipment may apply to the base station for the transmission resource, and transmit a message by using the transmission resource allocated by the base station. Therefore, in the resource allocation method in this embodiment, even if the first user equipment cannot obtain an available transmission resource by means of contention, the first user equipment can still transmit a message, so that communications quality and user equipment security are ensured.

Preferably, the information about the contention resource or the information about the non-contention resource is defined in any one of a master information block (MIB), a system information block (SIB), or radio resource control (RRC) signaling. In a specific implementation process, the information about the contention resource or the information about the non-contention resource may be transmitted in multiple manners. For example, a message of the contention resource or the information about the non-contention resource may be transmitted in one or more of a MIB, a SIB, or RRC in existing LTE, or may be transmitted by adding a new MIB, a new SIB, a new RRC message, or a new signaling type.

Preferably, the resource allocated by the base station to the first user equipment includes the contention resource and/or the non-contention resource. When the cellular network base station allocates the transmission resource to the first user equipment according to the application of the first user equipment, the base station not only can schedule the non-contention resource, but also can schedule all available contention resources, to improve transmission resource utilization to a maximum extent.

Preferably, X ms is determined by the base station or is a predefined time. Specifically, the predetermined time X ms may be assigned by the base station in the information about the contention resource or other information. The predefined time is a predetermined time, for example, the predefined time may be a time predefined by using a specification.

Preferably, the K times of contention is determined by the base station or is a predefined quantity of times. Specifically, the quantity K of contention times may be assigned by the base station in the information about the contention resource or other information. Alternatively, the quantity K of contention times is a predefined quantity of times, for example, the quantity K of contention times may be a quantity of contention times predefined by using a specification.

Preferably, the information about the contention resource or the information about the non-contention resource includes information about quantities and/or locations of the contention resource and the non-contention resource in a radio frame in which the resources are located. Specifically, the information about the contention resource or the information about the non-contention resource may include quantity information of the contention resource and quantity information of the non-contention resource, for example, quantities of subframes/timeslots occupied by the contention resource and the non-contention resource respectively in a single radio frame, or may include location distribution information of the contention resource and the non-contention resource in a radio frame structure. A preferred indication method is to indicate distribution of the contention resource and the non-contention resource by using a bitmap. As shown in FIG. 4, 1 indicates that the subframe/timeslot is a non-contention resource, and 0 indicates that the subframe/timeslot is a non-contention resource. It may be learned from FIG. 4 that the first to the seventh subframes/timeslots are non-contention resources, and the eighth to the tenth subframes are contention resources. Therefore, bit information corresponding to configuration information is 1111111000. In another preferred indication method, for example, it may be specified that a front part of an entire frame indicates non-contention resources, and a rear part indicates contention resources. If a quantity of non-contention resources is N, for the non-contention resources shown in FIG. 4, bits 0111 are enough to indicate the quantity of non-contention resources, that is, less bit information can indicate locations and quantities of the non-contention resources and the contention resources. However, in this method, the bit information needs to be specified or additionally assigned to indicate a location relationship between the non-contention resources and the contention resources. Certainly, a person skilled in the art may understand that the contention resource and the non-contention resource may be indicated in different manners. The contention resource may be located in front of the non-contention resource. Alternatively, the contention resources and the non-contention resources are cross-distributed.

It should be noted that the user equipment in this embodiment may be vehicle-mounted user equipment, or may be common user equipment.

Embodiment 4

Figure 6:
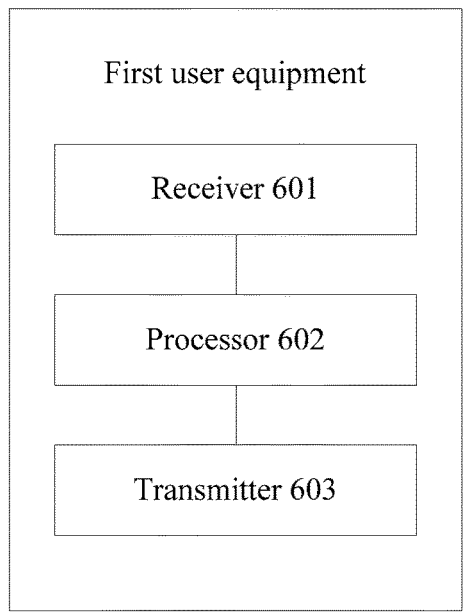
FIG. 6 is a schematic structural diagram of user equipment according to an embodiment of the present invention.

FIG. 6 is a structural diagram of first user equipment according to this embodiment. The user equipment includes:

a receiver 601, configured to receive information about a contention resource from a cellular network base station, where the contention resource is a transmission resource obtained in an autonomous contention manner;

a processor 602, configured to contend, according to the information that is about the contention resource and that is received by the receiver, for a transmission resource in a time window corresponding to the contention resource; and a transmitter 603, configured to: when the processor obtains the transmission resource, transmit a message to second user equipment by using the obtained transmission resource.

In this embodiment, the receiver 601 receives the information about the contention resource. User equipment in a cell, including the first user equipment, can learn, by using the information about the contention resource, a resource such as a subframe/timeslot that is the contention resource in resources. When the first user equipment needs to transmit a message in an initial access process or in a cell handover process, the first user equipment first contends for the transmission resource in the time window corresponding to the contention resource. If the first user equipment successfully obtains the transmission resource by means of contention, the first user equipment transmits the message by using the obtained transmission resource, and does not always need to first apply to the base station and wait for resource allocation. Therefore, a delay is effectively reduced. A message transmission delay can be effectively reduced by using the user equipment. During initial access, an access delay of the user equipment can be effectively reduced, and a message can be quickly transmitted to other user equipment. In addition, when the user equipment is applied to cell handover, the base station only assists, in a resource scheduling manner, user equipment in communication between user equipment. Therefore, when a cell is being handed over, information does not need to be exchanged between a source base station and a target base station, so that signaling overheads are reduced.

Preferably, the receiver is further configured to receive information about a non-contention resource from the base station, and the non-contention resource is a transmission resource allocated by the base station according to an application. The processor is further configured to apply to the base station for a transmission resource when the first user equipment obtains no transmission resource after X ms or after K times of contention, where X is a rational number, and K is a positive integer. Information obtained by the receiver from the base station further includes the information about the non-contention resource, that is, the first user equipment may also transmit a message by using the non-contention resource. Therefore, when obtaining no transmission resource after a predetermined time or predetermined times of contention, the processor of the first user equipment may apply to the base station for the transmission resource, and transmit a message by using the transmission resource allocated by the base station. Therefore, even if the processor of the first user equipment cannot obtain an available transmission resource by means of contention, the first user equipment can still transmit a message, so that communications quality and user equipment security are ensured.

Preferably, to avoid a contention conflict, that the processor is configured to contend for a transmission resource in a time window corresponding to the contention resource specifically includes: the processor is configured to: if the processor learns, by means of monitoring, that the transmission resource is in an idle state and the transmission resource is still in an idle state after Y ms, instruct the transmitter to transmit a message to the second user equipment by using the transmission resource, where Y is a rational number.

Preferably, the information about the contention resource or the information about the non-contention resource is carried in any one of a master information block, a system information block, or radio resource control signaling.

Preferably, the resource obtained by the processor from the base station by means of application includes the contention resource and/or the non-contention resource. When the cellular network base station allocates the transmission resource to the first user equipment according to the application of the processor, the base station not only can schedule the non-contention resource, but also can schedule all available contention resources, to improve transmission resource utilization to a maximum extent.

Preferably, X ms is determined by the base station or is a predefined time. Specifically, the predetermined time X ms may be assigned by the base station in the information about the contention resource or other information. The predefined time is a predetermined time, for example, the predefined time may be a time predefined by using a specification.

Preferably, the K times of contention is determined by the base station or is a predefined quantity of times. Specifically, the quantity K of contention times may be assigned by the base station in the information about the contention resource or other information. Alternatively, the quantity K of contention times is a predefined quantity of times, for example, the quantity K of contention times may be a quantity of contention times predefined by using a specification.

Preferably, the information about the contention resource or the information about the non-contention resource includes information about quantities and/or locations of the contention resource and the non-contention resource in a radio frame in which the resources are located. Specifically, the information about the contention resource or the information about the non-contention resource may include quantity information of the contention resource and quantity information of the non-contention resource, for example, quantities of subframes/timeslots occupied by the contention resource and the non-contention resource respectively in a single radio frame, or may include location distribution information of the contention resource and the non-contention resource in a frame structure. A preferred indication method is to indicate distribution of the contention resource and the non-contention resource by using a bitmap. As shown in FIG. 4, 1 indicates that the subframe/timeslot is a non-contention resource, and 0 indicates that the subframe/timeslot is a non-contention resource. It may be learned from FIG. 4 that the first to the seventh subframes/timeslots are non-contention resources, and the eighth to the tenth subframes are contention resources. Therefore, bit information corresponding to configuration information is 1111111000. In another preferred indication method, for example, it may be specified that a front part of an entire radio frame indicates non-contention resources, and a rear part indicates contention resources. If a quantity of non-contention resources is N, for the non-contention resources shown in FIG. 4, bits 0111 are enough to indicate the quantity of non-contention resources, that is, less bit information can indicate locations and quantities of the non-contention resources and the contention resources. However, in this method, the bit information needs to be specified or additionally assigned to indicate a location relationship between the non-contention resources and the contention resources. Certainly, a person skilled in the art may understand that the contention resource and the non-contention resource may be indicated in different manners. The contention resource may be located in front of the non-contention resource. Alternatively, the contention resources and the non-contention resources are cross-distributed.

It should be noted that the user equipment in this embodiment may be vehicle-mounted user equipment, or may be common user equipment.

Embodiment 5

This embodiment provides a cellular network base station, and the base station includes:

a transmitter, configured to send information about a contention resource to first user equipment, where the contention resource is a transmission resource obtained in an autonomous contention manner, the contention resource enables the first user equipment to contend for a transmission resource in a time window corresponding to the contention resource, and enables the first user equipment to transmit, when the first user equipment obtains the transmission resource, a message to second user equipment by using the obtained transmission resource.

In this embodiment, the transmitter sends the information about the contention resource. The first user equipment can learn, by using the information about the contention resource, a resource such as a subframe/timeslot that is the contention resource in resources.

When the first user equipment needs to transmit a message in an initial access process or in a cell handover process, the first user equipment first contends for the transmission resource in the time window corresponding to the contention resource. If the first user equipment successfully obtains the transmission resource by means of contention, the first user equipment transmits the message by using the obtained transmission resource, and does not always need to first apply to the base station and wait for resource allocation. Therefore, a delay is effectively reduced. In this manner, a data sending delay can be effectively reduced. When the base station is applied to initial access of user equipment, an access delay of the user equipment can be effectively reduced, and information can be quickly sent to other user equipment. In addition, when the base station is applied to cell handover, the base station only assists, in a resource scheduling manner, user equipment in communication between user equipment. Therefore, when a cell is being handed over, information does not need to be exchanged between a source base station and a target base station, so that signaling overheads are reduced.

Preferably, the base station further includes a receiver and a processor. The transmitter is further configured to send information about a non-contention resource to the first user equipment, and the non-contention resource is a transmission resource allocated by the base station according to an application. The receiver is configured to: when the first user equipment obtains no transmission resource after X ms or after K times of contention, receive an application submitted by the first user equipment to the base station to request allocation of a transmission resource. The processor is configured to allocate the transmission resource to the first user equipment according to the application, so that the first user equipment transmits a message to the second user equipment, where X is a rational number, and K is a positive integer. Information sent by the transmitter to the first user equipment further includes the information about the non-contention resource, that is, the first user equipment may also transmit a message by using the non-contention resource. Therefore, when obtaining no transmission resource after a predetermined time or predetermined times of contention, the first user equipment may apply to the base station for the transmission resource, and transmit a message by using the transmission resource allocated by the base station. Therefore, in the base station in this embodiment, even if the first user equipment cannot obtain an available transmission resource by means of contention, the first user equipment can still transmit a message, so that communications quality and user equipment security are ensured.

Preferably, the information about the contention resource or the information about the non-contention resource is carried in any one of a master information block (MIB), a system information block (SIB), or radio resource control (RRC) signaling. In a specific implementation process, the information about the contention resource or the information about the non-contention resource may be transmitted in multiple manners. For example, the information about the contention resource or the information about the non-contention resource may be transmitted in one or more of a MIB, a SIB, or RRC in existing LTE, or may be transmitted by adding a new MIB, a new SIB, a new RRC message, or a new signaling type.

Preferably, the transmission resource allocated by the processor to the first user equipment includes the contention resource and/or the non-contention resource. When the cellular network base station allocates the transmission resource to the first user equipment according to the application of the first user equipment, the processor not only can schedule the non-contention resource, but also can schedule all available contention resources, to improve transmission resource utilization to a maximum extent.

Preferably, X ms is determined by the processor or is a predefined time. Specifically, the predetermined time may be assigned by the processor in the information about the contention resource or other information. The predetermined time is a predefined time, and is a time predefined by using a specification.

Preferably, the K times of contention is determined by the processor or is a predefined quantity of times. Specifically, the quantity K of contention times may be assigned by the processor in the information about the contention resource or other information. Alternatively, the quantity K of contention times is a predefined quantity of times, for example, the quantity K of contention times may be a quantity of contention times predefined by using a specification.

Preferably, the information about the contention resource or the information about the non-contention resource includes information about quantities and/or locations of the contention resource and the non-contention resource in a radio frame in which the resources are located. Specifically, the information about the contention resource or the information about the non-contention resource may include quantity information of the contention resource and quantity information of the non-contention resource, for example, quantities of subframes/timeslots occupied by the contention resource and the non-contention resource respectively in a single radio frame, or may include location distribution information of the contention resource and the non-contention resource in a frame structure. A preferred indication method is to indicate distribution of the contention resource and the non-contention resource by using a bitmap. As shown in FIG. 4, 1 indicates that the subframe/timeslot is a non-contention resource, and 0 indicates that the subframe/timeslot is a non-contention resource. It may be learned from FIG. 4 that the first to the seventh subframes/timeslots are non-contention resources, and the eighth to the tenth subframes are contention resources. Therefore, bit information corresponding to configuration information is 1111111000. In another preferred indication method, for example, it may be specified that a front part of an entire radio frame indicates non-contention resources, and a rear part indicates contention resources. If a quantity of non-contention resources is N, for the non-contention resources shown in FIG. 4, bits 0111 are enough to indicate the quantity of non-contention resources, that is, less bit information can indicate locations and quantities of the non-contention resources and the contention resources. However, in this method, the bit information needs to be specified or additionally assigned to indicate a location relationship between the non-contention resources and the contention resources. Certainly, a person skilled in the art may understand that the contention resource and the non-contention resource may be indicated in different manners. The contention resource may be located in front of the non-contention resource. Alternatively, the contention resources and the non-contention resources are cross-distributed.

The user equipment in this embodiment may be vehicle-mounted user equipment, or may be common user equipment.

Embodiment 6

Figure 7:
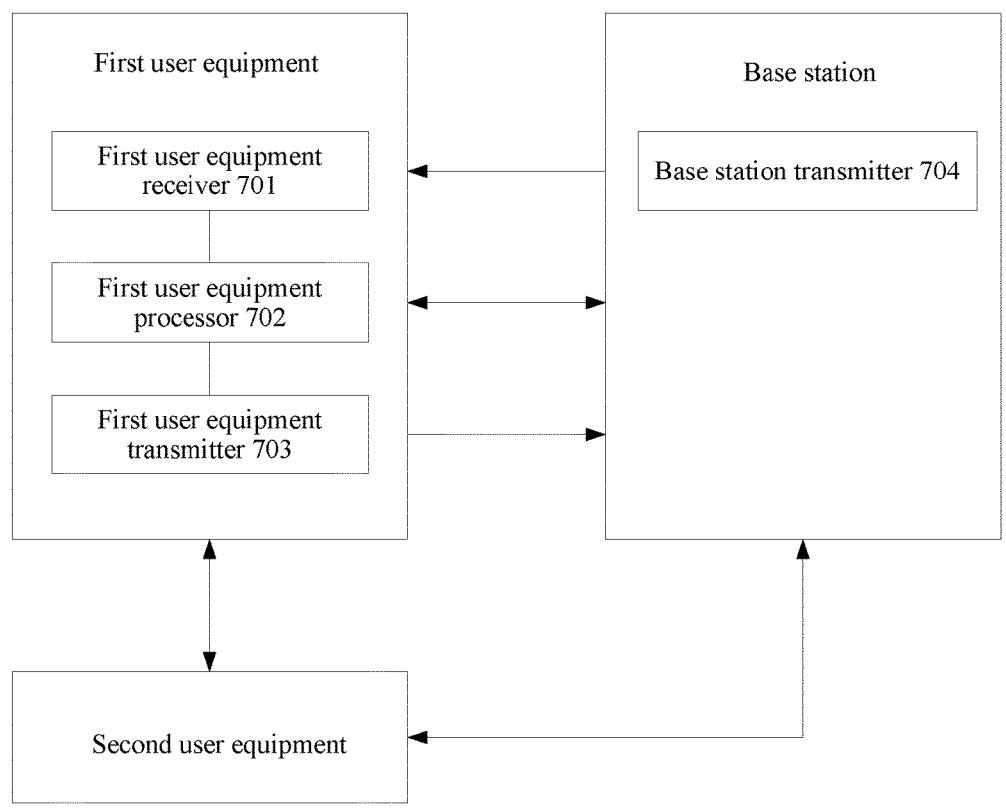
FIG. 7 is a schematic structural diagram of a communications system according to an embodiment of the present invention.

FIG. 7 is a structural diagram of a communications system according to this embodiment. The communications system includes first user equipment and a cellular network base station.

The first user equipment includes:

a first user equipment receiver 701, configured to receive information about a contention resource from the base station, where the contention resource is a transmission resource obtained in an autonomous contention manner;

a first user equipment processor 702, configured to contend, according to the information that is about the contention resource and that is received by the receiver, for a transmission resource in a time window corresponding to the contention resource; and a first user equipment transmitter 703, configured to: when the processor obtains the transmission resource, transmit a message to second user equipment by using the obtained transmission resource.

The base station includes:

a base station transmitter 704, configured to send the information about the contention resource to the first user equipment.

In this embodiment, user equipment in a cell, including the first user equipment, can learn, by using the information about the contention resource, a resource such as a subframe/timeslot that is the contention resource in resources. For the contention resource, the first user equipment may initiate contention for the contention resource without waiting for resource allocation performed by the base station. If the first user equipment successfully obtains the transmission resource by means of contention, the first user equipment sends data by using the obtained contention resource, and does not always need to first apply to the base station for a resource. Therefore, a delay is effectively reduced. In this manner, a data sending delay can be effectively reduced. When the communications system is applied to initial access, an access delay of the user equipment can be effectively reduced, and information can be quickly sent to other user equipment. In addition, when the communications system is applied to cell handover, the base station only assists, in a resource scheduling manner, user equipment in communication between user equipment. Therefore, when a cell is being handed over, information does not need to be exchanged between a source base station and a target base station, so that signaling overheads are reduced.

Preferably, the base station further includes a base station receiver and a base station processor. The base station transmitter is further configured to send information about a non-contention resource to the first user equipment, and the non-contention resource is a transmission resource allocated by the base station according to an application. The base station receiver is configured to: when the first user equipment obtains no transmission resource after X ms or after K times of contention, receive an application submitted by the first user equipment to the base station to request allocation of a transmission resource. The base station processor is configured to allocate the transmission resource to the first user equipment according to the application, so that the first user equipment transmits a message to the second user equipment, where X is a rational number, and K is a positive integer. Information sent by the base station transmitter to the first user equipment further includes the information about the non-contention resource, that is, the first user equipment may also transmit a message by using the non-contention resource. Therefore, when obtaining no transmission resource after a predetermined time or predetermined times of contention, the first user equipment may apply to the base station for the transmission resource, and transmit a message by using the transmission resource allocated by the base station. Therefore, in the base station in this embodiment, even if the first user equipment cannot obtain an available transmission resource by means of contention, the first user equipment can still transmit a message, so that communications quality and user equipment security are ensured.

The user equipment in this embodiment may be vehicle-mounted user equipment, or may be common user equipment.

A person skilled in the art may clearly understand that, in the embodiments of the present invention, the message sending method, the resource configuration method, the message sending method in a cell handover process, the user equipment, the base station, and the communications system not only can be used for communication in the Internet of Vehicles, but also can be used for communication in any other scenarios. The user equipment in the embodiments of the present invention includes but is not limited to a vehicle, vehicle-mounted user equipment, and a communications device that may be in a moving state at different speeds.

A person skilled in the art may clearly understand that, the technologies in the present invention may be implemented by software in addition to a necessary general hardware platform. Based on such an understanding, the technical solutions of the present invention essentially or the part contributing to the prior art may be implemented in a form of a software product. The software product may be stored in a storage medium, such as a ROM/RAM, a magnetic disk, or an optical disc, and includes several instructions for instructing a computer device (which may be a personal computer, a server, or a network device) to perform the methods described in the embodiments or some parts of the embodiments of the present invention.

The foregoing descriptions are merely specific embodiments of the present invention, but are not intended to limit the protection scope of the present invention. Any variation or replacement readily figured out by a person skilled in the art within the technical scope disclosed in the embodiments of the present invention shall fall within the protection scope of the present invention. Therefore, the protection scope of the present invention shall be subject to the protection scope of the claims.

What is claimed is:

1. A method carried out on a first user equipment (UE) for transmitting a message from the first UE to a second UE, the method comprising:
receiving, from a cellular network base station, first information about a contention resource, where the contention resource obtained without waiting for allocation of the contention resource by the cellular network base station;
contending for a transmission resource in a time window associated with the contention resource such that, after obtaining the transmission resource, the first UE is enabled to transmit the message to the second UE by using the transmission resource;
receiving, from the cellular network base station, second information about a non-contention resource, where the non-contention resource is distinct from the contention resource, that is allocated by the cellular network base station according to an application;
failing to obtain the transmission resource of the contention transmission resource during the contending;
applying, to the cellular network base station in response to the failing, for an another transmission resource from the non-contention resource; and
transmitting the message to the second UE using the another transmission resource that is allocated to the first UE in response to the applying.

2. The method according to claim 1,
wherein the failing to obtain occurs after a threshold condition is sensed taken from the group consisting of:
the first UE failing to obtain the transmission resource after X ms; and
the first UE failing to obtain the transmission resource after K times of contention,
wherein X is a rational number, and
wherein K is a positive integer.

3. The method according to claim 2, wherein the information about the contention resource and the information about the non-contention resource is carried in any one of the group consisting of:
a master information block,
a system information block, and
a radio resource control signaling.

4. The method according to claim 1, wherein the contending for the transmission resource in the time window associated with the contention resource comprises:
learning, through monitoring, that the transmission resource is in an idle state and the transmission resource is still in the idle state after Y ms; and
transmitting the message to the second user equipment by using the transmission resource,
wherein Y is a rational number.

5. A method carried out on a first user equipment (UE) in a cell handover process in a cellular network for transmitting a message from the first UE to a second UE, wherein the method comprises:
receiving a measurement control signal from a source base station;
reporting a measurement report to the source base station for a neighboring cell measurement;
receiving, when a handover is required, first information about a contention resource and sent by a target base station, where the contention resource is obtained without waiting for allocation of the contention resource;
contending for a transmission resource in a time window associated with the contention resource such that, after obtaining the transmission resource, the first UE is enabled to transmit the message to the second UE by using the transmission resource;
receiving, from the target base station, second information about a non-contention resource, where the non-contention resource is distinct from the contention resource, that is allocated by the target base station according to an application;
failing to obtain the transmission resource of the contention transmission resource during the contending;
applying, to the target base station in response to the failing, for an another transmission resource from the non-contention resource; and
transmitting the message to the second UE using the another transmission resource that is allocated to the first UE in response to the applying.

6. The method according to claim 5,
wherein the failing to obtain occurs after a threshold condition is sensed taken from the group consisting of:
the first UE failing to obtain the transmission resource after X ms; and
the first UE failing to obtain the transmission resource after K times of contention,
wherein X is a rational number, and
wherein K is a positive integer.

7. The method according to claim 6, wherein X ms is determined by one or more of the group consisting of:
the target base station, and
a predefined time.

8. The method according to claim 6, wherein the K times of contention is determined by one or more of the group consisting of:
the target base station, and
a predefined quantity of times.

9. The method according to claim 5, wherein the information about the contention resource and the information about the non-contention resource is carried in any one of the group consisting of:
a master information block,
a system information block, and
radio resource control signaling.

10. The method according to claim 5, wherein the information about the contention resource or the information about the non-contention resource comprises at least one of the group consisting of:
a quantity of the transmission resource in a radio frame in which the transmission resource is located, and
a location of the transmission resource in a radio frame in which the transmission resource is located.

11. A first user equipment (UE) comprising: a receiver, a transmitter, a non-transitory computer-readable medium including computer-executable instructions, and a processor configured to carry out a method for transmitting a message from the first UE to a second UE, the method comprising:
receiving, from a cellular network base station, first information about a contention resource, where the contention resource is obtained without waiting for allocation of the contention resource by the cellular network base station;
contending for a transmission resource in a time window associated with the contention resource such that, after obtaining the transmission resource, the first UE is enabled to transmit the message to the second UE by using the transmission resource;
receiving, from the cellular network base station, second information about a non-contention resource, where the non-contention resource is distinct from the contention resource, that is allocated by the cellular network base station according to an application;

failing to obtain the transmission resource of the contention transmission resource during the contending;

applying, to the cellular network base station in response to the failing, for an another transmission resource from the non-contention resource; and transmitting the message to the second UE using the another transmission resource that is allocated to the first UE in response to the applying.

12. The user equipment according to claim 11, wherein the failing to obtain occurs after a threshold condition is sensed taken from the group consisting of:

the first UE failing to obtain the transmission resource after X ms; and the first UE failing to obtain the transmission resource after K times of contention, wherein X is a rational number, and wherein K is a positive integer.

13. The user equipment according to claim 11, wherein the contending for the transmission resource in the time window associated with the contention resource comprises:

learning through monitoring, that the transmission resource is in an idle state and the transmission resource is still in the idle state after Y ms; and transmitting the message to the second user equipment by using the transmission resource, wherein Y is a rational number.

14. The user equipment according to claim 11, wherein the information about the contention resource and the information about the non-contention resource is carried in any one of the group consisting of:

a master information block, a system information block, and radio resource control signaling.

15. A communications system, comprising:

a first user equipment (UE); and a cellular network base station, wherein the first user equipment comprises a receiver, a transmitter, a non-transitory computer-readable medium including computer-executable instructions, and a processor configured to carry out a method for transmitting a message from the first UE to a second UE, the method comprising:

receiving, from a cellular network base station, first information about a contention resource, where the contention resource is obtained without waiting for allocation of the contention resource by the cellular network base station;

contending for a transmission resource in a time window associated with the contention resource such that, after obtaining the transmission resource, the first UE is enabled to transmit the message to the second UE by using the transmission resource;

receiving, from the cellular network base station, second information about a non-contention resource, where the non-contention resource is distinct from the contention resource, that is allocated by the cellular network base station according to an application;

failing to obtain the transmission resource of the contention transmission resource during the contending;

applying, to the cellular network base station in response to the failing, for an another transmission resource from the non-contention resource; and transmitting the message to the second UE using the another transmission resource that is allocated to the first UE in response to the applying, and wherein the cellular network base station comprises a base station transmitter, and the cellular network base station is configured to send the information about the contention resource to the first user equipment, and allocate the transmission resource to the first user equipment according to the application.

16. The communications system according to claim 15, wherein the base station further comprises a base station receiver, a base station non-transitory computer-readable medium including computer-executable instructions, and a base station processor;

wherein the failing to obtain occurs after a threshold condition is sensed taken from the group consisting of:

the first UE failing to obtain the transmission resource after X ms; and the first UE failing to obtain the transmission resource after K times of contention, wherein X is a rational number, and wherein K is a positive integer.

* * * * *